Feb. 13, 1968  D. E. GIBSON ETAL  3,368,282
BOWSIGHT

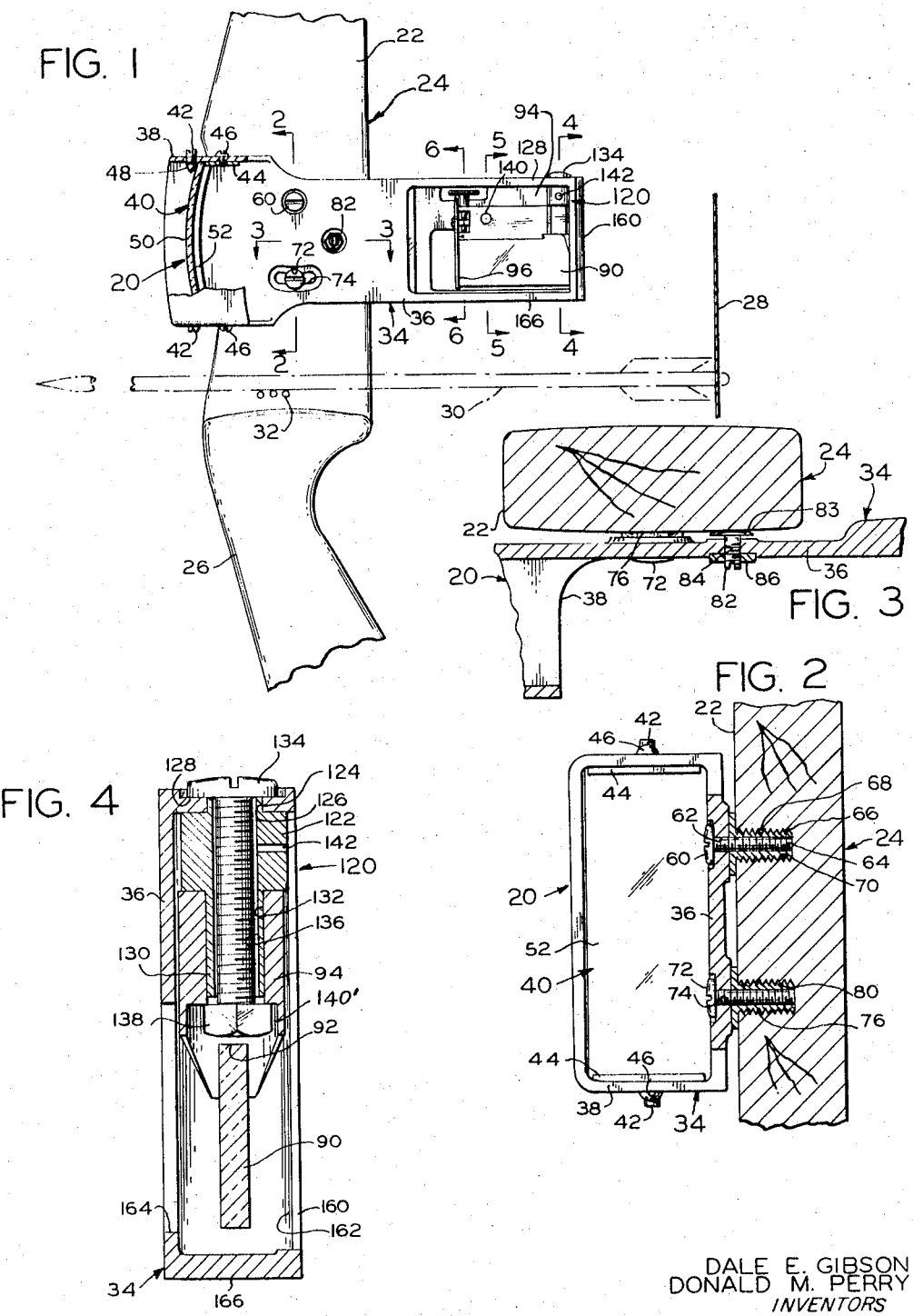

Filed Nov. 29, 1965  3 Sheets-Sheet 2

DALE E. GIBSON
DONALD M. PERRY
INVENTORS

BY
BUCKHORN, BLORE, KLARQUIST & SPARKMAN
ATTORNEYS

Feb. 13, 1968   D. E. GIBSON ETAL   3,368,282
BOWSIGHT
Filed Nov. 29, 1965   3 Sheets-Sheet 3
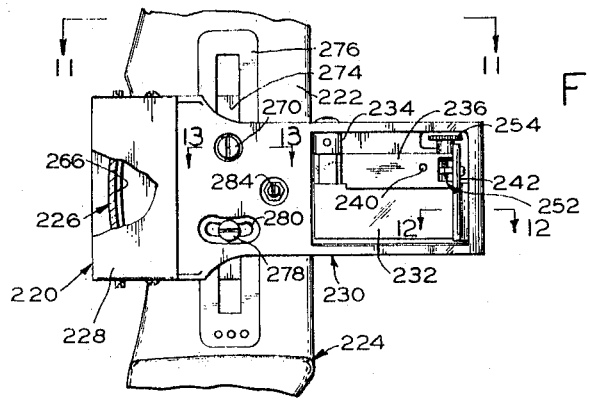
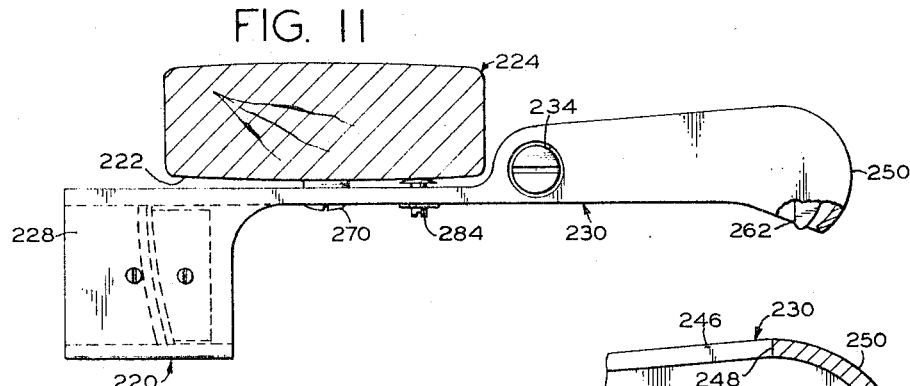
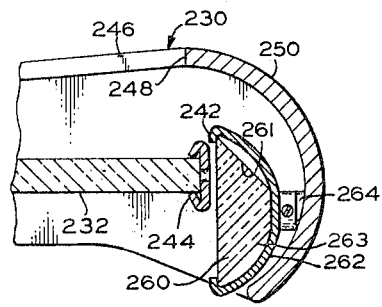
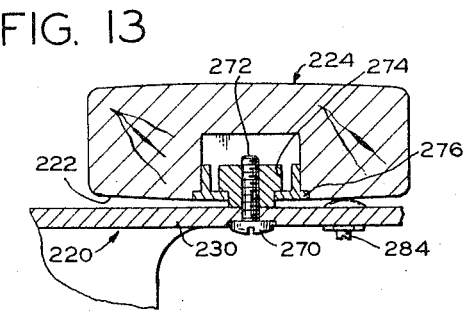
DALE E. GIBSON
DONALD M. PERRY
INVENTORS
BY
BUCKHORN, BLORE, KLARQUIST & SPARKMAN
ATTORNEYS 3,368,282
Patented Feb. 13, 1968

3,368,282
BOWSIGHT
Dale E. Gibson, Portland, and Donald M. Perry, Gresham, Oreg., assignors to Leupold & Stevens Instruments, Inc., Portland, Oreg., a corporation of Oregon
Filed Nov. 29, 1965, Ser. No. 510,308
17 Claims. (Cl. 33—46)

ABSTRACT OF THE DISCLOSURE

A bowsight includes a semi-reflecting lens of zero power mounted by a frame adjustably on a bow. A light-gathering bar of fluorescent material such as methyl methacrylate impregnated with an iridescent dye is mounted for angular adjustment on the frame to compensate for windage, and a reticle plate is adjustable vertically on the bar to compensate for elevation. A mirror at one end of the bar reflects light into the bar. A modified bowsight has a frame adjustable on a bow and has a folded light path. A light bar angularly adjustable on the frame gathers light and projects it through a vertically adjustable reticle plate to a prism, which directs the light to a semi-reflective lens.

Description

This invention relates to improved bowsights, and more particularly to bowsights which project images of reticles onto targets.

In archery, to obtain accuracy through consistency in shooting, it is essential for the archer to have an anchor point at which he holds his hand that is holding the bowstring and the nocked end of the arrow. Most archers use one of two anchor points, the first being at a corner of the mouth with which it is very difficult to avoid variations, and the second being at the center of the chin. These anchor points place the bowstring in the field of vision of the sighting eye and aiming is effected by aligning the bowstring with an open sight on the bow or with the tip of the arrow and bringing this line of sight to a particular relationship to the target. Actually focusing simultaneously on the very close bowstring, the sight on the bow and the distant target is, of course, impossible, and is more difficult at low light levels where the iris of the sighting eye is opened wider with a consequent decrease in depth of focus of the eye. As a result it is very difficult to keep the position of the bowstring at the precise position desired. Also, a small deviation of position of the sight on the bow or the bowstring causes a substantial error in aim since the target is many times farther from the sight than the distance from the bowstring to the sight. Telescopic sights have been used but have small fields and small exit pupils so that they are difficult to get on target quickly, which problem is aggravated when the target is moving. Such telescopic sights also must be adjusted for different ranges. It would be desirable for a bowsight to eliminate errors from variations in anchor point and have a large field and a large equivalent exit pupil so that to accurately aim both for azimuth and elevation the bow can be quickly brought on target. It would also be desirable to provide such sight which requires no adjustment over a very wide range of target distances. It would also be desirable for a bowsight to permit an anchor point to be used with which the bowstring is completely out of the field of vision of the sighting eye. It also would be desirable for a bowsight to provide a reticle image contrasting to the target in brightness and in color. It would also be desirable to provide a bowsight which is rugged, compact, inexpensive, can be easily mounted on any type of bow, can be easily adjusted to the individual archer's anchor point and can be easily adapted to either a righthand bow or a lefthand bow.

An object of the invention is to provide improved bowsights.

Another object of the invention is to provide bowsights which project images of reticles onto targets.

Another object of the invention is to provide bowsights having wide fields of view and also having wide equivalent exit pupils so as to enable users to locate targets therethrough quickly.

A further object of the invention is to provide bowsights which reduce deviations from anchor points and permit the bowstrings to be positioned completely out of the fields of view of the sighting eyes.

Yet another object of the invention is to provide bowsights which are rugged, compact, inexpensive, can be easily mounted on any type of bow, can be easily adjusted to the individual archer's anchor points and can be easily adapted to either a righthand bow or a lefthand bow.

A still further object of the invention is to provide bowsights having acrylic light-gathering bars adapted to project illuminated images of reticles onto partially reflective lenses directed toward targets.

Another object of the invention is to provide bowsights which can be easily and quickly adjusted to individual archers.

Another object of the invention is to provide bowsights which project reticle images to the targets to provide great accuracy in aiming.

Another object of the invention is to provide bowsights having reticles which are easily focused and have easily effected elevation adjustments and which also have easily effected azimuth adjustments.

The invention provides bowsights each having a reticle and an optical system in which an image of the reticle is projected onto a partially reflective lens and in focus at a target. The archer sights through the lens, and when the reticle image reflected by the lens appears to be on the target, his aim is correct regardless of the position of the bowstring relative to his sighting eye. In a bowsight forming one specific embodiment of the invention a base of a frame is mounted on the side of a bow somewhat above the arrow rest for adjustment for elevation and for azimuth. The frame carries a short lens-mounting tube at the front end thereof in which is mounted a zero power lens having a convex spherical forward surface and a concave spherical rear surface having a coating thereon which is partially light reflective and partially light transmissive. A light source comprising a light-gathering bar of acrylic material having an iridescent dye of a color contrasting with the color of the target is mounted on the rear portion of the frame in a position extending toward the lens. The bar gathers light and projects the light to the lens through a reticle opening in a reticle plate mounted on the front end of the bar. The partially reflective surface of the lens reflects the reticle image back to the sighting eye of an archer using the bow. The light-gathering bar is adjustable with the reticle plate toward and away from the lens to cause the reticle image to be in apparent focus at a predetermined target distance in front of the bow. The rear end of the bar is mounted on the frame pivotally on a vertical axis and adjustment means at the front end of the bar may be actuated to adjust the azimuth of the bar for sighting in and for windage adjustment. The reticle plate is adjusted vertically on the bar to provide an elevation adjustment. The reticle opening preferably is of a range-finding configuration with marks so spaced that, when the image of the marks is filled by a target object of a known dimension, the bow is correctly positioned for both elevation and azimuth.

A bowsight forming an alternate embodiment of the invention is similar to the first-described embodiment except that the light-gathering bar projects light through a reticle plate away from the lens and a prism reflects the light back to the lens thereby providing a folded light path and permitting the frame to be correspondingly shorter than that of the first-described embodiment.

A complete understanding of the invention may be obtained from the following detailed description of bowsights forming specific embodiments thereof, when read in conjunction with the appended drawings, in which:

FIG. 1 is a fragmentary side elevation view of a bowsight forming one embodiment of the invention mounted on a bow;

FIG. 2 is an enlarged vertical sectional view taken substantially along line 2—2 of FIG. 1;

FIG. 3 is an enlarged horizontal sectional view taken substantially along line 3—3 of FIG. 1;

FIG. 4 is an enlarged vertical sectional view taken substantially along line 4—4 of FIG. 1;

FIG. 10 is a fragmentary, side elevation view of a bowsight forming an alternate embodiment of the invention and mounted on a bow;

FIG. 11 is an enlarged horizontal sectional view taken substantially along line 11—11 of FIG. 10;

FIG. 12 is an enlarged horizontal sectional view taken substantially along line 12—12 of FIG. 10; and FIG. 13 is an enlarged horizontal sectional view taken substantially along line 13—13 of FIG. 10.

Figure 5:
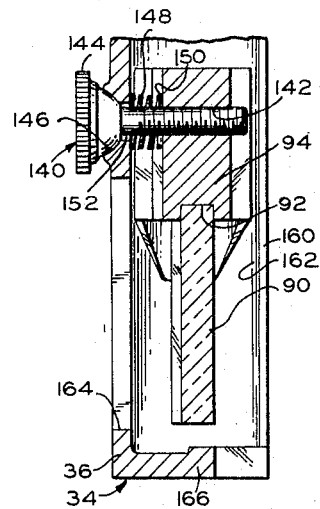
FIG. 5 is an enlarged vertical sectional view taken substantially along line 5—5 of FIG. 1.
Figures 6, 6A:
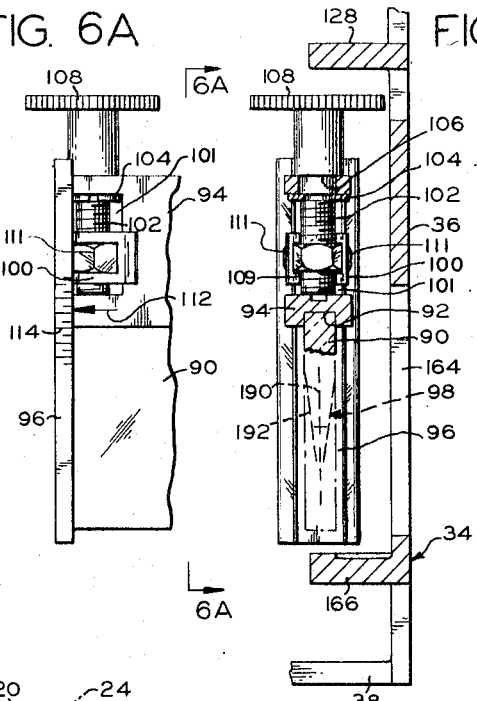
FIG. 6 is an enlarged vertical sectional view taken substantially along line 6—6 of FIG. 1.
FIG. 6A is an enlarged side elevation view taken substantially along line 6A—6A of FIG. 6.

Referring now in detail to the drawings, there is shown in FIGS. 1 to 8 a bowsight 20 forming one embodiment of the invention and mounted adjustably on a side face 22 of a stiff central portion of a bow 24 having a handle portion 26. A bowstring 28 is mounted on the bow and is shown in engagement with a nocked end of an arrow 30 resting on an arrow rest 32. A frame 34 of the bowsight includes a mounting plate 36 and a short lens tube 38 at the side end at the forward end thereof. The lens tube mounts in a hooded or shaded position therein a glass lens 40 by means of set screws 42 and stop plates 44 secured to the top and bottom thereof by screws 46, the screws 42 and 46 being screwed into tapped bores in the lens tube. The plates 44 are preferably of tough, impregnated fibre material, and tips 48 of the screws 42 preferably are of nylon. The lens 40 has no magnifying power and has a spherical, convex front surface 50 and a spherical, concave rear surface 52 which has a partially reflecting coating thereon to make it partially reflective. The surface 52 preferably is about 45% reflective and about 55% transmissive. The surfaces 50 and 52 are parallel so that the lens has no magnifying power. The radius of the surface 52 in one constructed embodiment of the invention was about eight and one-half inches. The lens has a very large field of view and is about twice as long as it is wide to provide a sufficiently large field of view in the vertical dimension that the range-finding reticle is visible throughout the full hunting range of the bow, without adjustment of the bowsight, the hunting range being from ten to over eighty yards.

The mounting plate 36 (FIGS. 1, 2 and 3) is mounted for elevation adjustment about the axis of a horizontal screw 60 fitting in a countersunk hole 62 in the mounting plate and threaded into a tapped bore 64 in a hexheaded bushing 66 having an external, wood screw thread 68 screwed into hole 70 in the bow 24. A clamping screw 72 extends through a counter-bored arcuate slot 74 and is screwed into a bushing 76 like the bushing 66 and threaded into a hole 80 in the bow. To adjust the frame 34 for azimuth, there is provided an adjustment screw 82 having a large, rounded, nylon cap 83 (FIG. 3) screwed through threaded bore 84 extending through a boss portion 86 of the mounting plate. The elevation adjustment may be made by loosening both screws 60 and 72 pivoting the frame on the screw 60 to the desired position thereof and then retightening the screws. The azimuth adjustment may be made by threading the adjustment screw 82 farther or less through the tapped bore 84 preferably while the screws 60 and 72 are slightly loose and then tightening the screws 60 and 72.

An elongated light-gathering plate or bar 90 of a light-gathering or fluorescent material, such as, for example, methyl methacrylate, is impregnated with or has its exit end face coated with an iridescent dye. The bar 90 is mounted at its top edge portion by an adhesive in a groove 92 in a bar-like mounting member or carrier frame 94. A reticle plate 96 of dovetail, channel-like cross section and preferably of sheet metal has a reticle in the form of a reticle-shaped opening or aperture 98 therein. The reticle plate, except for the aperture, is opaque and is slidable vertically along a dovetailed end portion of the member 94, and rests on and covers the front end of the bar with the aperture aligned with the bar. A friction nut 100 (FIG. 6) is splined in a vertical guideway 101 in the member 94 and is adjustable vertically by an adjusting screw 102 threadedly extending through the nut and mounted against endwise movement thereof relative to the member 94 by a snap ring 104 and a shoulder 106 at the bottom of a knurled knob 108. A pair of slotted spring arms 109 of the reticle plate snap over projections 111 of the nut 100 to detachably mount the reticle plate on the nut. The upper face of the knob 108 has equally spaced, radially extending lines (not shown) forming a scale to indicate the position of rotation of the screw relative to the frame 34. When the adjusting screw is rotated, it moves the reticle plate up or down, depending on the direction of rotation of the screw, relative to the light-gathering bar 90. This adjusts the reticle opening 98 vertically relative to the bar 90, the extent of adjustment being indicated by a pointer 112 (FIG. 6A) on a scale 114 formed on one flange of the reticle plate. Preferably the adjusting screw has a thread pitch of $\frac{1}{32}$ of an inch and the marks of the scale 114 are spaced this distance apart. Thus, the reading of the pointer 112 gives the number of complete revolutions of the screw from a starting position and the radial scale on the top face of the knob 108 gives the fraction of one revolution of the screw, a suitable pointer mark (not shown) preferably being formed on the portion of the mounting member 94 adjacent to and in a radial position relative to the head 108 of the adjustment screw to indicate the position of the head 108.

To move the reticle plate 96 (FIGS. 1 and 6) toward or away from the lens 40 to effect a precise focus of the reticle, there is provided an eccentric bushing 120 (FIGS. 1 and 4) having an enlarged collar portion 122, a cylindrical upper end portion 124 fitting tightly and rotatably in a bore 126 in a top flange 128 of the frame 36, and a lower cylindrical portion 130, which is eccentric to the upper end portion 124 and fits closely and rotatably in a vertical bore 132 in the member 94. A clamping screw 134 extending quite loosely through bore 136 in the bushing 120 and normally screwed sufficiently into a nut 138 in recess 140' in the bottom portion of the mounting member 94 to clamp the bushing against rotation relative to the frame 36 may be loosened to permit turning of the bushing 120 in the bore 126. Such turning is effected by inserting a pin into a socket 142 in the collar portion 122 of the bushing grasping the pin and swinging the pin. The eccentric portion 130, as it is so turned, moves the mounting member 94 with the reticle plate 96 thereon longitudinally relative to the lens 40 (FIG. 1) to bring the reticle plate 96 at the desired position of focus. The screw 134 (FIG. 4) screwed into the nut 138 sufficiently then is tightened to clamp the bushing firmly with the reticle plate in the desired longitudinal position of adjustment relative to the semi-reflective surface 52 of the lens 40.

To effect precise azimuth adjustment of the reticle plate 96 (FIG. 1) relative to the lens 40, an adjustment screw 140 (FIG. 5) is screwed further into or further out of, as desired, a tapped bore 142 extending transversely through a portion of the mounting member 94 positioned substantially forwardly of the bushing 120 (FIG. 1). The screw 140 (FIG. 5) has a head 144 fitting loosely in a socket 146 formed in the frame 34 to permit pivotal movement of the screw and longitudinal movement of the screw relative to the frame 34 to prevent binding when the member 94 is pivoted and/or moved longitudinally in focusing. A compression spring 148 seats on a portion 150 of the bar and on the frame 34 which has a clearance slot 152 therein. The screw 140 is held against accidental turning by a suitable spring detent (not shown). The screw 140 has a pointer (not shown) indicating on a scale (not shown) on the frame 36 the adjusted position of the bar 90.

The frame 34 has at the rear end thereof a semi-cylindrical end flange 160 (FIGS. 1, 4, 5 and 7) having an inner, concave, semi-cylindrical reflective surface 162. The surface 162 gathers light and reflects it into the rear end of the light-gathering bar 90, the rear end of the bar 90 being positioned relative to the reflective surface 162 so as to receive and transmit therealong the maximum amount of light reflected thereto by the reflective surface 162. The end flange 160 also covers the bar 90 to mask its brightness from a sighting eye 163 of the archer. The frame has a large light-admitting opening 164 extending along one side face of the bar 90 to transmit light thereto and the other side face of the bar 90 is open to ambient light also. A lower flange 166 of the frame extends below the bar 90 to protect the bar.

Figure 7:
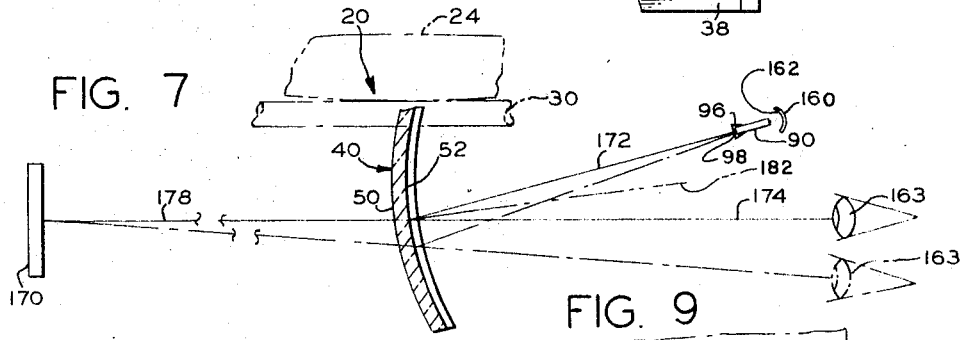
FIG. 7 is a plan view showing schematically the optical system of the bowsight of FIG. 1.
Figure 8:
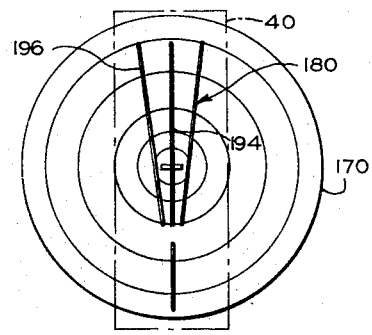
FIG. 8 is an elevation view of the field of view of an archer using the bowsight of FIG. 1.

In FIG. 7 there is shown schematically in plan the optical system of the bowsight 20 with the bow 24 and the arrow 30 precisely positioned, at least azimuth-wise, on a target 170 positioned at a desired calibrating distance of, for example, forty yards. A ray 172 projected through the reticle aperture 98 in the reticle plate 96 is reflected by the semi-reflecting surface 52 of the lens 40 along a line 174 to the sighting eye 163 of the archer. The bowsight has been so adjusted for azimuth that the line 174 is coincident with a ray 178 coming from the vertical centerline of the target 170. The reticle plate 96 is so focused relative to the semi-reflective surface 52 that a reticle image 180 (FIG. 8) reflected to the sighting eye 163 (FIG. 7) appears to be at the target. The light-gathering bar 90, which serves as the projector light source, and the reticle plate are positioned laterally out of the line of sight of the eye 163 to the target 170 and a line 182 normal to the surface 52 and extending from about the midpoint of the surface 52 does, of course, divide equally the angle between the lines 172 and 174, the lens 40 being somewhat off perpendicular relative to the line 174, the cant of the lens 40 being about 3½° in one constructed embodiment of the invention. With the bow 24 and the arrow in the same positions as shown in FIG. 7 and with the eye 163 of the archer shifted relative to the bow from the full line position of the eye to the broken line position thereof, the center of the reticle image 180 (FIG. 8) still appears to the archer to be exactly on the vertical centerline of the target 170 and to emanate therefrom. Thus, the bowsight is free of parallax. When the target is a different distance from the bow than the calibrated distance, there is a slight error in azimuth, the bow being about one inch off target when the target distance is eighty yards and the sighting in and adjustment of the bowsight being at forty yards. Such error is, of course, negligible. It will be noted that the center of the lens is somewhat farther out from the bow than is the arrow 30 and the nocked end of the arrow being in the plane of the bowstring, the arrow is not parallel to the lines 174 and 178. However, this difference is compensated for by the azimuth adjustment of the bowsight during sighting in.

The elevation adjustment of the bowsight 20 on the bow 24 is effected during sighting in by loosening the screws 60 and 72 (FIG. 1) and turning the frame 34 on the screw 60 to the desired position, after which the screws are retightened.

The reticle aperture 98 (FIG. 6) includes a crosshairs 190 and a V-shaped, range-finding portion 192. The crosshairs form an image portion 194 (FIG. 8) and are adapted to center the bow on target at the calibrated distance. The range-finding portion 192 (FIG. 6) forms a V-shaped image portion 196 so tapered relative to the trajectory of the arrow that the points on the lines thereof at opposite sides of the center of the reticle image portion 194 span a selected predetermined distance of, for example, eighteen inches of the target 170 and, whenever that distance on a target at a different range is known to the archer and is spaced exactly by the lines of the image 196, the bow is at the correct elevation angle for that range.

Figure 9:
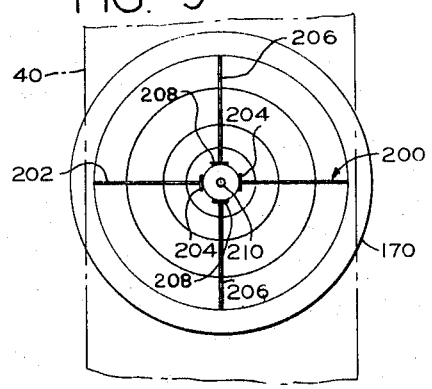
FIG. 9 is a view similar to FIG. 8 with an alternate form of reticle in the bowsight of FIG. 1.

If desired, an alternate reticle plate (not shown) like the reticle plate 96 (FIG. 6) but having a different reticle aperture may be substituted for the reticle plate 96, the reticle aperture of the alternate reticle plate forming a reticle image 200 (FIG. 9) apparently projected onto the target 170. The reticle aperture forms aligned horizontal lines 202 having short vertical lines 204 at the adjacent ends thereof, aligned vertical lines 206 having short horizontal lines 208 at the adjacent ends thereof and a center dot 210. The lines 204 are spaced apart so as to exactly span a selected distance at the sighting in range, and the lines 206 are similarly spaced. Thus, the reticle image 200 is of range-finding configuration whenever the target or something adjacent the target has a dimension equal to the selected distance.

The bowsight 20 can be easily adapted to a left-handed bow (not shown) merely by turning the bowsight over and mounting it on the other side of the bow, after substituting a reticle plate (not shown) like the reticle plate 96 (FIG. 6) but having a reticle aperture inverted with respect to the reticle aperture 98.

A bowsight 220 (FIGS. 10 to 13) forming an alternate embodiment of the invention and mounted adjustably on a side face 222 of a bow 224 is generally similar to the bowsight 20 but has a folded light path so that the bowsight 220 is more compact. The bowsight 220 has a spherical lens 226 identical with the lens 40 and carried in a short lens tube 228 of a frame 230. A light source comprising a light-gathering plate or bar 232 of light-gathering or fluorescent material is carried pivotally on a vertical axis by an eccentric pin 234. The pin 234 is mounted on the frame 230 for focusing adjustment of the light-gathering bar along the frame. The pin 234 mounts a support member 236 like the member 94 and the bar 232 is cemented to the member 236.

An azimuth adjusting mechanism 240 like the azimuth adjusting mechanism of the bowsight 20 serves to pivot the member 236 on the pin 234. A dovetailed, flanged reticle plate 242 having a scale thereon and having a suitable reticle aperture therein is slidable vertically on the end of the light-gathering bar 232, a vertical dovetailed guideway 244 (FIG. 12) being formed in the end portion of the member 236. The frame 230 has a cupped mounting portion 246 having a light opening 248 adjacent one face of the bar and also has a semi-cylindrical rear cover 250.

A vertical adjusting mechanism 252 like that of the bowsight 20 is carried by the member 236 for adjusting the reticle plate 242 vertically relative to the light-gathering bar. One flange of the reticle plate has a calibrated scale (not shown) thereon and a knurled knob 254 has a calibrated scale like that of the knob 108 (FIG. 6) to indicate the vertical adjustment of the reticle plate 242 (FIGS. 10 and 12).

A prism 260 carried by a holder 262 secured by bracket portions 264 to the frame 230 receives light projected by the bar 232 through the reticle aperture in the reticle plate 242. Mirror surfaces 261 and 263 of the prism project the reticle image onto a semi-reflecting surface 266 of the lens 226. The surface 266 reflects the reticle image back to the sighting eye of the archer as if the image were in focus at the sighting in target range.

The frame 230 is mounted for pivotal adjustment on a horizontal pin 270 (FIG. 1) threaded into a tapped bore 272 in a member 274 fixed to a plate 276 of the bow. A screw 278 screwed into a similar tapped bore (not shown) in the member 274 extends through an arcuate slot 280 in the frame 230 and may be loosened to permit pivotal adjustment of the frame about the screw 270 and then retightened to clamp the frame in adjusted position. An adjustment screw 284 is provided for coarse azimuth adjustment of the bowsight 220, the adjustment screw 284 being screwed into a tapped bore in the frame 230 and bearing against the side face 222.

The above described bowsights 20 and 220 are very accurate both in azimuth and in elevation since they project the reticle images out to the sighting in target range and since the position of the sighting eye is independent of the anchor point used. The bowsights 20 and 220, while being compact, have large fields of view, the fields of view being several times that of telescopic sights. The bowsights 20 and 220, while having no exit pupil in the strict sense of that term, do enable the archer to see the reticle image and the target throughout a range of movement of the sighting eye laterally of the lenses of the bowsights several times greater than is possible with telescopic sights. Because of the large fields of view and the large equivalents of exit pupils of the bowsights 20 and 220, the bowsights may be brought rapidly on target and are aptly designated "fast sights." The fields of view of the bowsights 20 and 220 are sufficiently large that the reticle images and targets are visible over a very large range of from ten to over eighty yards. The bright reticle images, which preferably are orange, yellow or other color contrasting sharply with that of the target, contrast with the target and are readily visible. The bowsights are simple, compact and rugged. While batteries and incandescent lamps could be used in place of the light-gathering bars as light sources, the light-gathering bars are compact and trouble-free and each forms the reticle image with ambient light. The bowsights may be easily adapted from right-handed to left-handed bows merely by substituting reticles.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:
1. In an optical sight,
a frame having a concave, reflective surface at the rear end thereof,
a light-gathering bar mounted on the frame in a position extending therealong and having a light-admitting end positioned to receive light from the reflective surface and also having a light-emitting end,
reflective means positioned to receive light from the light-emitting end of the bar,
and a reticle plate having an aperture therein positioned between the bar and the reflective means.
2. In an optical sight,
a light-gathering bar having a light-emitting end,
a mounting member having a guideway extending parallel to the light-emitting end of the bar,
an aperture plate having a guide portion slidably engaging the guideway in an adjustable position at and covering the light-emitting end of the bar,
and optical means receiving light projected by the bar through the aperture plate.
3. In a bowsight,
an elongated mounting frame,
a lens mounted on one end portion of the mounting frame and having a semi-reflective surface,
eccentric adjustment means mounted on the mounting frame,
a carrier frame having one end mounted pivotally on the eccentric means,
azimuth adjustment means for pivoting the carrier frame on the eccentric means,
the eccentric adjustment means serving to adjust said one end of the carrier frame laterally of the mounting frame,
a light-gathering bar carried by the carrier frame for projecting light toward the lens,
and a reticle plate having an aperture and mounted at one end of the bar in the path of light projected by the bar toward the lens.
4. The bowsight of claim 3 including a prism positioned between the reticle plate and the lens.
5. The bowsight of claim 3 including elevation adjustment means for adjusting the reticle plate vertically relative to the bar.
6. In combination,
a bow having a handle portion,
a mounting frame having an upper bore, an arcuate slot centered on the bore and a tapped bore spaced laterally from a line between the slot and the upper bore,
a first screw extending through the upper bore into the handle portion of the bow for mounting the frame pivotally thereon,
a second screw extending through the slot for clamping the frame to the bow,
an adjustment screw extending through the tapped bore and engaging the bow,
and optical sight means carried by the mounting frame.
7. In a bowsight,
a frame having a tubular lens-holding portion at the forward end thereof and having a rearwardly extending portion,
a semi-reflective lens held by the lens-holding portion,
a semi-reflective lens mounted in the lens-holding portion,
a bar of light-gathering material having a light-emitting end,
means mounting the bar on the rearwardly extending portion of the frame for lateral adjustment of the bar relative to the frame,
reticle means,
and means mounting the reticle means in the path of light from the light-emitting end of the bar and adjustably relative to the bar.
8. In a bowsight,
a semi-reflective lens of zero power,
frame means mounted on a bow and carrying the lens,
a bar of light-gathering material having a light-emitting end,
means mounting the bar on the frame for pivotal adjustment on a vertical axis of the bar relative to the frame,
a reticle plate having an aperture,
and reticle-mounting means mounting the reticle plate for vertical adjustment relative to the bar and in the path of light from the bar.
9. The bowsight of claim 8 wherein the light-emitting end of the bar is directed toward the lens.

10. The bowsight of claim 8 wherein the light-emitting end of the bar is directed away from the lens, and reflective means for directing the light from the bar toward the lens.

11. The bowsight of claim 8 wherein the reticle-mounting means includes means mounting the reticle plate for vertical sliding movement on the light-emitting end of the bar.

12. The bowsight of claim 11 wherein the bar is a plate-like member of methyl methacrylate.

13. The bowsight of claim 12 wherein the plate-like member is mounted in a vertical plane.

14. In a bowsight,
a frame having a central portion adapted to be secured to a bow, a forward lens-holding portion and a rear plate-like mounting portion,
a semi-reflecting lens mounted in the lens-holding portion,
a plate-like bar of light-gathering material having a light-emitting end,
means mounting the bar for pivotal adjustment about a vertical axis on the mounting portion of the frame,
and a reticle mounted in the path of light from the light-emitting end of the bar.

15. The bowsight of claim 14 wherein the light-emitting end of the bar is adjacent the lens and the bar is directed toward the lens.

16. The bowsight of claim 14 wherein the bar is directed away from the lens and the light-emitting end of the bar is remote from the lens, and reflective means for directing light from the bar to the lens.

17. The bowsight of claim 16 including a concave, cylindrical, reflecting mirror positioned at the end of the bar remote from the light-emitting end for directing light into the bar.

References Cited

UNITED STATES PATENTS

| | | | |
|---|---|---|---|
| 666,665 | 1/1901 | Griffith | 33—58 |
| 1,265,766 | 5/1918 | Fessenden | 33—50.5 |
| 1,491,141 | 4/1924 | Johnston | 33—57 |
| 2,351,103 | 6/1944 | Brown | 33—46.4 |
| 2,420,503 | 5/1947 | Stechbrat | 33—50.5 |
| 2,545,454 | 3/1951 | Fredrickson | 33—46.4 |
| 2,596,522 | 5/1952 | Bethke | 33—47 |
| 2,633,051 | 3/1953 | Davis | 33—47 |
| 2,706,335 | 4/1955 | Munsey | 33—47 |
| 2,925,657 | 2/1960 | Stenby | 33—47 |
| 2,982,026 | 5/1961 | Peterson | 33—46.4 |
| 3,058,221 | 10/1962 | McNeel | 33—46.4 |
| 3,120,222 | 2/1964 | Bear | 33—46.4 |

FOREIGN PATENTS

| | | |
|---|---|---|
| 726,699 | 10/1942 | Germany. |
| 349,314 | 5/1931 | Great Britain. |
| 754,018 | 8/1956 | Great Britain. |

SAMUEL S. MATTHEWS, *Primary Examiner.*